United States Patent [19]

Schlenker

[11] Patent Number: 5,462,246
[45] Date of Patent: Oct. 31, 1995

[54] ANTI-ROTATION CLAMP FOR GATED IRRIGATION PIPE

[76] Inventor: Donald D. Schlenker, Meeteetse Rte., Burlington, Wyo. 82411

[21] Appl. No.: 141,522

[22] Filed: Oct. 27, 1993

[51] Int. Cl.$^6$ ............................................. F16L 1/04
[52] U.S. Cl. ........................... 248/49; 248/74.4; 248/316.5
[58] Field of Search .................... 248/49, 74.4, 316.5; 405/172

[56] References Cited

U.S. PATENT DOCUMENTS

| | | | |
|---|---|---|---|
| 5,263,796 | 11/1993 | de Waal | 248/49 |
| 5,290,127 | 3/1994 | Foster | 248/49 |

Primary Examiner—Alvin C. Chin-Shue
Attorney, Agent, or Firm—Risto A. Rinne, Jr.

[57] ABSTRACT

An anti-rotation pipe clamp type of apparatus is described for securing a section of gated irrigation pipe thereto. The section of gated irrigation pipe is placed on top of the ground surface. One or more anti-rotation pipe clamps are used, as necessary, to prevent the various sections of gated irrigation pipe from rotating axially as they are periodically heated and cooled. The anti-rotation pipe clamp includes a base that is placed on top of the ground surface and maintains the anti-rotation pipe clamp in a predetermined attitude with respect to the ground surface that is generally parallel thereto. A clamping mechanism is attached to the base that includes a flexible strap which is attached to the base at one end and which surrounds a portion of the gated irrigation pipe. A winch is used to tighten the flexible strap around any of a variety of sections of gated irrigation pipe each having a particular outside diameter and to secure the particular section of gated irrigation pipe to an arcuate surface that is attached to the anti-rotation pipe clamp. When the section of gated irrigation pipe is secured to the anti-rotation pipe clamp, the base prevents the anti-rotation pipe clamp from axially rotating with respect to the ground surface which, in turn, prevents the section of gated irrigation pipe from axially rotating with respect to the ground surface.

7 Claims, 2 Drawing Sheets

ANTI-ROTATION CLAMP FOR GATED IRRIGATION PIPE

BACKGROUND OF THE INVENTION

1. Field of the Invention

The present invention, in general, relates to apparatus used to prevent movement of pipes placed above the ground and, more particularly, to devices that prevent gated irrigation pipe from axially rotating.

The use of gated irrigation pipe for controlling the dispersing of irrigation water is well known. Gated irrigation pipe is available in various diameters, various lengths, and is constructed of various types of materials of which aluminum and PVC (poly-vinyl-chloride) are among the most common.

The most common way in which the sections of gated irrigation pipe are joined together is by having a smaller end of each pipe (or pipe fitting) slide into another larger bell-shaped end that is located on the side opposite of each section of pipe that the smaller end is located. Many other types of clamping arrangements that are also known are useful for joining sections of gated pipe together or for joining sections of gated pipe to pipe fittings.

All forms of gated irrigation pipe are in general placed on top of the ground surface and include gates that are located at spaced apart intervals along each section of pipe. Each of the gates are opened as desired, either fully or proportionately, to regulate the flow of irrigation water therefrom or certain of the gates are closed to prevent the flow of water therefrom.

The gates are disposed generally in a row along the longitudinal length of each section of pipe. The row of gates is then positioned at a predetermined height above the ground surface according to the demands and the preferences of each particular situation.

For example, it is not usually desirable to orient the row of gates so that it faces generally down towards the ground surface because this promotes rapid erosion of the soil in proximity to each gate by the force of the water leaving the gates. Therefore the rows of gates are normally positioned either parallel with the ground surface or slightly above or slightly below parallel depending upon factors such as the quantity of water that is desired to flow through each gate, the water pressure (or "head of water" as it is more commonly referred to), and the general soil composition in the area.

The proper attitude for each row of gates on each section of pipe is unique for each application of gated irrigation pipe. However, once a line of gated irrigation pipe is properly installed, it is desirable to maintain the gates in same orientation with respect to the ground surface.

However as the sun strikes the section of pipe they expand. When they cool at night or as clouds pass overhead, they contract. The resultant increase and decrease in the longitudinal length of each section of gated pipe is generally not significant nor is it detrimental. However, the repeated cycles of expansion and contraction cause certain of the sections of gated irrigation pipe to rotate axially thereby displacing the rows of gates away from the predetermined and desired position that they had immediately following installation.

Accordingly there exists today a need for an anti-rotation clamp for gated irrigation pipe that prevents the sections of gated irrigation pipe from rotating axially when the pipes are placed upon the ground surface.

2. Description of Prior Art

Pipe clamps are, in general, known. Anti-rotational types of pipe clamps for use with gated irrigation pipe are not generally known. For example, the following patents describe various types of pipe clamps:

U.S. Pat. No. 3,568,455 to McLaughlin et al, that issued Mar. 9, 1971;

U.S. Pat. No. 3,609,932 to Di Pirro, Oct. 5, 1971;

U.S. Pat. No. 3,700,197 to Branton, Oct. 24, 1972;

U.S. Pat. No. 3,964,707 to Lewis, Jun. 22, 1976;

U.S. Pat. No. 3,966,154 to Perrault et al, Jun. 29, 1976;

U.S. Pat. No. 4,389,034 to Suttles, Jun. 21, 1983;

U.S. Pat. No. 4,445,656 to Leitch et al, May 1, 1984;

U.S. Pat. No. 5,007,768 to Waller, Apr. 16, 1991;

U.S. Pat. No. 5,042,958 to Stenersen, Aug. 27, 1991;

U.S. Pat. No. 5,156,491 to Russell, Oct. 20, 1992.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide an anti-rotation clamp for gated irrigation pipe that is placed on the ground surface.

It is also an object of the invention to provide an anti-rotation clamp for gated irrigation pipe that is adaptable to fit various diameter sections of gated irrigation pipe.

It is also an object of the invention to provide an anti-rotation clamp for gated irrigation pipe that is sized to fit a particular diameter section of gated irrigation pipe.

Another object of the invention is to provide an anti-rotation clamp for gated irrigation pipe that is easy to install.

Still another object of the invention is to provide an anti-rotation clamp for gated irrigation pipe that is easy to remove.

Yet another object of the invention is to provide an anti-rotation clamp for gated irrigation pipe that helps to prevent axial rotation of gated irrigation pipe with respect to the ground surface.

Briefly, an anti-rotation clamp for gated irrigation pipe that is constructed in accordance with the principles of the present invention has a base that is placed on top of the ground surface. A clamping mechanism is attached to the base and is used to secure a section of gated irrigation pipe in position with respect to the anti-rotation clamp. The base is generally aligned parallel with respect to the ground surface and it maintains this orientation as the sections of gated irrigation pipe expand and contract longitudinally as a result of heating and cooling, caused by sunlight periodically striking each section of gated irrigation pipe or by the general heat of the day and by the cool of the night. The clamping mechanism, according to one embodiment, includes an adjustable strap that is placed under and around the pipe and is tightened to remove slack and to secure the section of gated irrigation pipe to the anti-rotation clamp. The strap accommodates a variety of pipe diameters.

According to a modification, the clamping mechanism includes a first clamp half and a second clamp half that are hinged together at one end of each clamp half and are generally sized to fit each particular diameter of pipe. The first and second clamp halves are placed over the top of the gated irrigation pipe and are tightened around the pipe by a crank handle having a threaded end. As the first and second clamp halves are tightened they are urged closer together and the section of gated irrigation pipe is thereby secured to the modified type of anti-rotation clamp by the first and second clamp halves. The anti-rotation clamps are spaced apart and are attached to the sections of gated irrigation pipe where desired. As few as one anti-rotation clamp is required for certain applications to prevent rotation of the sections of gated irrigation pipe while for other applications, a plurality of anti-rotation clamps are required.

DETAILED DESCRIPTION OF THE INVENTION

Figure 1:
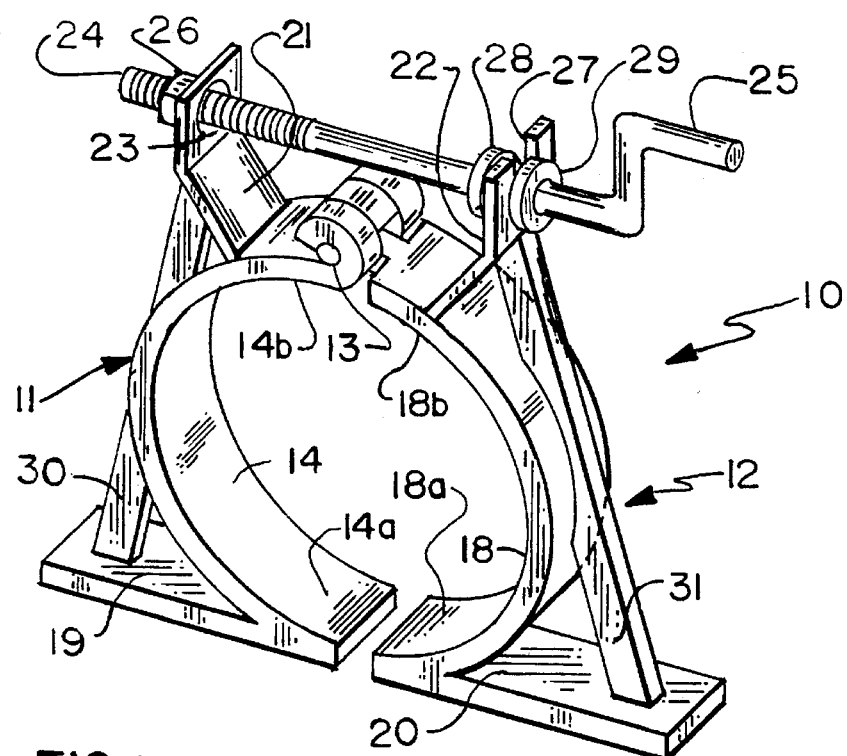
FIG. 1 is a view in perspective of a hinged type of an anti-rotation clamp for gated irrigation pipe shown generally in the closed position.
Figure 2:
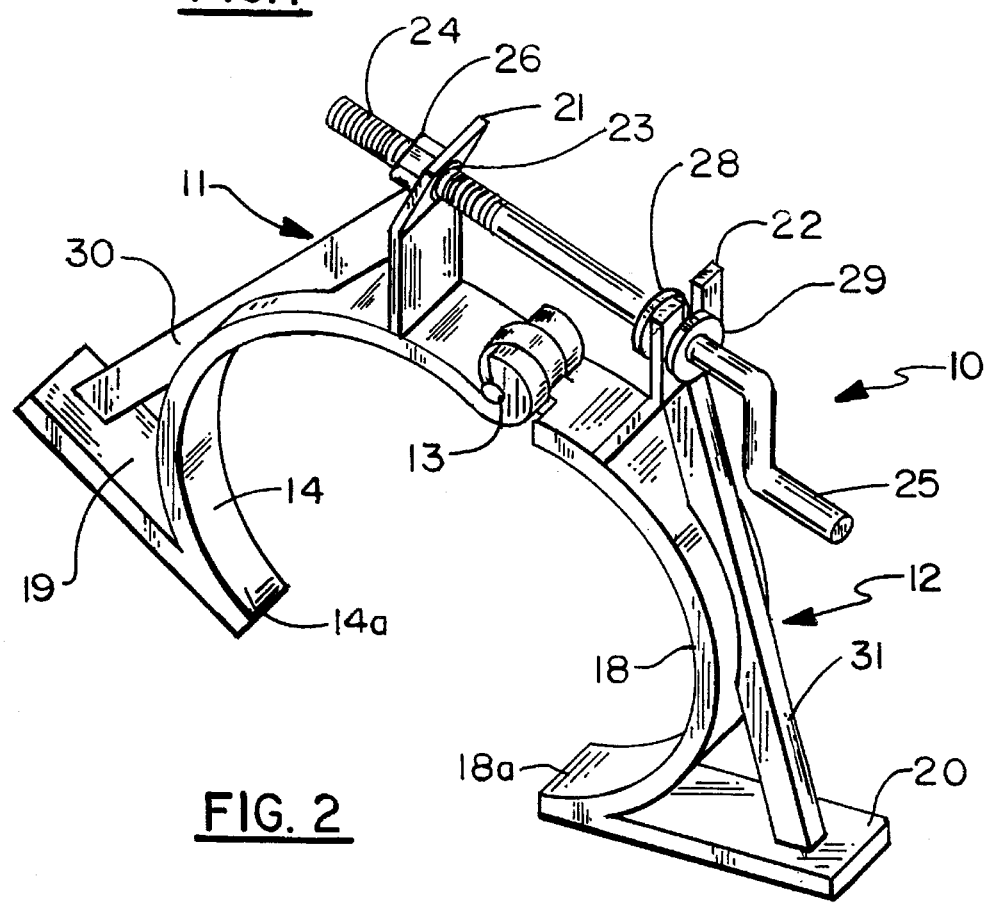
FIG. 2 is a view in perspective of a hinged type of an anti-rotation clamp for gated irrigation pipe shown generally in the open position.
Figure 3:
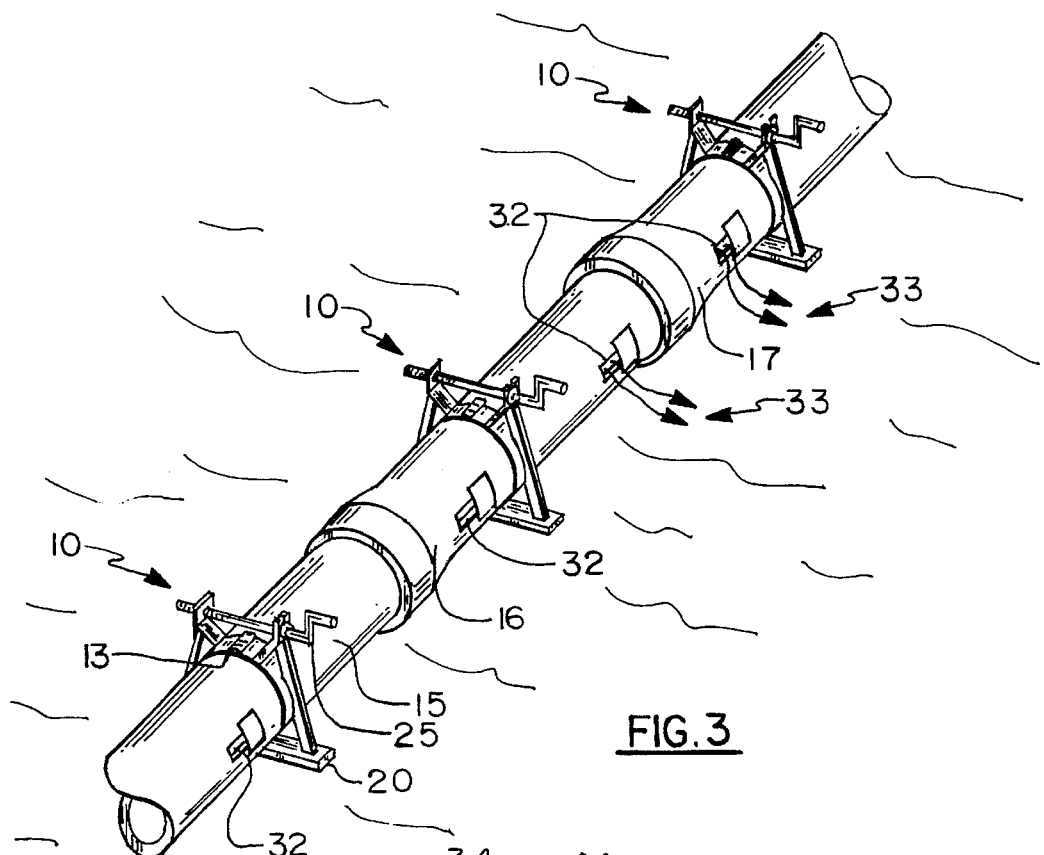
FIG. 3 is a view in perspective of a plurality of hinged types of an anti-rotation clamps for gated irrigation pipe shown generally attached to a plurality of sections of gated irrigation pipe.

Referring to FIG. 1, FIG. 2, and FIG. 3 is shown, a hinged type of anti-rotation clamp for gated irrigation pipe, identified in general by the reference numeral 10.

The clamp 10 includes a first clamp half, identified in general by the reference numeral 11, and a second clamp half, identified in general by the reference numeral 12, that are pivotally attached together at a first end thereof by a hinge 13.

The use of a flat type of material stock is preferred, but not necessary, for construction of many of the component parts of the clamp 10. For example a mild steel, aluminum, plastic, or composite flat stock of material can be used. The use of even a round type of material stock for construction of many of the component parts of the clamp 10 will achieve many of the objects of the invention, although such use is not generally considered to be optimum.

The first clamp half 11 includes an first inner strap 14 having a first end 14a and a second end 14b and having an arcuate surface that is curved to match closely with the contour of the outside diameter of a section of gated irrigation pipe (Three sections of gated irrigation pipe are identified in FIG. 3 by the reference numerals 15, 16, and 17.).

The second clamp half 12 includes an second inner strap 18 having a first end 18a and a second end 18b and having an arcuate surface that is curved to match closely with the contour of the outside diameter of a section of gated irrigation pipe 15.

The radius of the arcuate surfaces of the first inner strap 14 and the second inner strap 18 are modified to adapt the clamp 10 to any desired diameter section of gated irrigation pipe 15.

A first base section 19 is attached at a first end thereof to the first end of the first inner strap 14a and a second base section 20 is attached at a first end thereof to the first end of the second inner strap 18a.

A portion of the hinge 13 is attached to the second end of the first inner strap 14b and also to the second end of the second inner strap 18b thereby pivotally attaching the first inner strap 14 to the second inner strap 18, and therefore also pivotally attaching the first clamp half 11 to the second clamp half 12.

A first protrusion member 21 is attached to the first inner strap 14 at a location that is closer in proximity to the hinge 13 than to where the first base section 19 is attached to the first inner strap 14.

A second protrusion member 22 is attached to the second inner strap 18 at a location that is closer in proximity to the hinge 13 than to where the second base section 20 is attached to the second inner strap 18.

The first and second protrusion members 21, 22 extend generally away from the first inner strap 14 and away from the second inner strap 18 and also generally away from the first and second base sections 19, 20 respectively.

The first protrusion 21 includes a first opening 23 that is adapted to receive a threaded portion 24 of a crank 25. A nut 26 is provided that is secured to the first protrusion 21 and cooperates with the threaded portion 24 of the crank 25. The nut 26 does not rotate with respect to the first protrusion 21.

The nut 26 is preferred, however, to be loosely attached to the first protrusion 21 so that it may change its alignment slightly to better cooperate with the crank 25 when the crank 25 is either tightened or loosened, as is described in greater detail hereinbelow.

The nut 26 is attached to the first protrusion 21 by locking tabs (not shown) that are attached to the first protrusion 21 and which surround the nut 26 or by any method that is desired. Accordingly, the first opening 23 is also made somewhat larger than is the outer diameter of the threaded portion 24 of the crank 25.

The second protrusion 22 includes a first slot 27 that is open at one end thereof to an end of the second protrusion 22 that is not attached to the second inner strap 18. The first slot 27 is adapted to receive the crank 25 therein. The crank 25 includes a first retainer ring 28 and a second retainer ring 29 that are each attached to the crank 25 at a distance that is separated apart from each other sufficient to allow the crank 25 to pass into the first slot 27 with the first retainer ring 28 situated on one side of the first slot 27 and with the second retainer ring 29 situated on the remaining side thereof.

As the crank 25 is either tightened or is loosened, the first and second retainer rings 28, 29 maintain the crank 25 in the same relative position longitudinally with respect to the second protrusion member 22. The threaded portion 24 in cooperation with the nut 26 urges the first protrusion member 21 either closer toward or further away from the second protrusion member 22 as the crank 25 is rotated.

A first gusset member 30 is attached at one end thereof to the first base section 19 and is attached to the first protrusion 21 on the remaining end thereof and is attached intermediate to the one end thereof and to the remaining end thereof to the first inner strap 14. The first gusset member 30 provides increased strength and rigidity to the first protrusion 21, the first inner strap 14, and the first base section 19.

A second gusset member 31 is attached at one end thereof to the second base section 20 and is attached to the second protrusion 22 on the remaining end thereof and is attached intermediate to the one end thereof and to the remaining end thereof to the second inner strap 18. The second gusset member 31 provides increased strength and rigidity to the second protrusion 22, the second inner strap 18, and the second base section 20.

Referring now in particular to FIG. 1, the clamp 10 is shown generally in the closed or tightened position as if it were already placed around a section of gated irrigation pipe 15. However the pipe 15 is not shown in the FIG. 1 drawing to provide improved clarity of construction of the clamp 10.

Referring now in particular to FIG. 2, the clamp is shown generally in the open position as if it were to be either removed from or inserted over and fastened around a section of gated irrigation pipe 15. However the pipe 15 is not shown in the FIG. 2 drawing to provide improved clarity of construction of the clamp 10.

Normally it is not necessary to loosen the crank 25 to the extent as is shown in the FIG. 2 drawing in order to be able to remove the clamp 10 or to secure the clamp 10 to the gated irrigation pipe 15, as is described in greater detail hereinbelow.

Referring once again to FIG. 1, FIG. 2, and to FIG. 3 when the crank 25 is rotated in a direction that generally tightens the threaded portion 24 with respect to the nut 26, the first protrusion 21 is urged closer toward the second protrusion 22, which in turn urges the first clamp half 11 and the second clamp half 12 to pivot about the hinge 13 so that the first end of the first inner strap 14a and the first end of the second inner strap 18a are urged into a position that is spaced further apart with respect to each other.

This is useful for providing the necessary clearance between the first end of the first inner strap 14a and the first end of the second inner strap 18a necessary to remove the clamp 10 apart from, or to insert the clamp 10 over each of the sections of gated irrigation pipe 15, 16, and 17 where its use is desired.

When the clamp 10 is removed from a section of the gated irrigation pipe 15, the crank 25 is typically loosened only slightly and then the end of the crank 25 that is located generally furthest away from the threaded portion 24 is raised a sufficient amount so that it and the first and second retainers 28, 29 may be removed from a position of cooperation with the first slot 27 at the earliest practical opportunity.

The first clamp half 11 is then able to pivot freely about the hinge 13 with respect to the second clamp half 12. Accordingly, the crank 25 does not have to be loosened to the extent necessary to urge the first end of the first inner strap 14a and the first end of the second inner strap 18a apart a distance that exceeds the outside diameter of the section of gated irrigation pipe 15.

Rather the first and second clamp halves 11, 12 need only be loosened enough so that the crank 25 may be lifted out of the first slot 27. The first and second clamp halves 11, 12 are then readily pivoted an amount that is sufficient to exceed the outside diameter of the section of gated irrigation pipe 15 in order to remove the clamp 10 therefrom.

When the clamp 10 is inserted over a section of gated pipe 15, the first and second clamp halves 11, 12 are pivoted together and the crank 25 is inserted into the first slot 27 with first and second retainers 28, 29 each being located on opposite sides respectively of the first slot 27. The crank 25 is then turned to tighten the first and second clamp halves 11, 12 about the section of gated irrigation pipe 15. The gated irrigation pipe 15 is thereby secured to the clamp 10.

If preferred, a reverse type of a thread (not shown) for the threaded portion 24 is included so that a clockwise rotation of the crank 25 will result in the tightening of the first and second clamp halves 11, 12 about the section of gated irrigation pipe 15 and a counter-clockwise rotation of the crank 25 will result in the loosening of the first and second clamp halves 11, 12 about the section of gated irrigation pipe 15.

The first base section 19 and the second base section 20 are placed around the section of gated irrigation pipe 15 so that they rest on top of the ground surface. As the section of gated irrigation pipe 15 either expands or contracts the gated irrigation pipe 15 is maintained in the same axial orientation with respect to the ground surface.

Referring momentarily to FIG. 3, three sections of gated irrigation pipe 15, 16, 17 are shown attached together. Each of the three sections of gated pipe 15, 16, 17 are shown as having an anti-rotation clamp 10 affixed thereto although the actual number of clamps 10 required and the spacing between each of the clamps 10 will vary according to the requirements of each particular application.

For example in certain geographical areas where there is a greater disparity between the average daytime temperature and the average night-time temperature, a greater number of clamps 10 are required. In other applications, the sections of gated irrigation pipe 15, 16, 17 may be located predominantly on the north side of a slope and therefore not be subject to significant heating or cooling by the sun, and accordingly only a few clamps 10 that are spaced relatively far apart are required to prevent rotation of the sections of gated irrigation pipe 15, 16, 17 from occurring. If it is preferred a plurality of clamps 10 (not shown) are used with each section of gated irrigation pipe 15, 16, 17.

A plurality of gates 32 are shown attached to the sections of gated irrigation pipe 15, 16, 17. Water, identified in general by the reference numeral 33, is shown flowing out of certain of the plurality of gates 32 which have been opened. The first and second base sections 19, 20 of each of the clamps 10 rest on top of the ground surface.

As the sections of gated irrigation pipe 15, 16, 17 are each secured to each of the clamps 10, the clamps 10 prevent axial rotation along the longitudinal axis of the gated irrigation pipe 15, 16, 17 from occurring with respect to the ground surface as the sections of gated irrigation pipe 15, 16, 17 occasionally expand and contract. Accordingly the plurality of gates 32 are maintained at the same attitude with respect to the ground surface as the sections of gated irrigation pipe 15, 16, 17 expand and contract.

The clamps 10 are able to slide over the ground surface longitudinally as the longitudinal length of the sections of gated irrigation pipe 15, 16, 17 change due to their expansion and contraction while still maintaining the sections of gated irrigation pipe 15, 16, 17 in the same axial orientation with respect to the ground surface.

The clamps 10 are left attached to the sections of gated irrigation pipe 15, 16, 17 for the entire irrigating season if desired, or certain of the clamps 10 are loosened and are removed apart from the sections of gated irrigation pipe 15, 16, 17 and are then used with other sections of gated irrigation pipe (not shown) that are located elsewhere.

As preferred, a locknut (not shown) is attached to the threaded portion 24 and is tightened against the nut 26 to prevent any undesired rotation of the crank 25 should any livestock (not shown) happen to brush against the crank 25.

Figure 4:
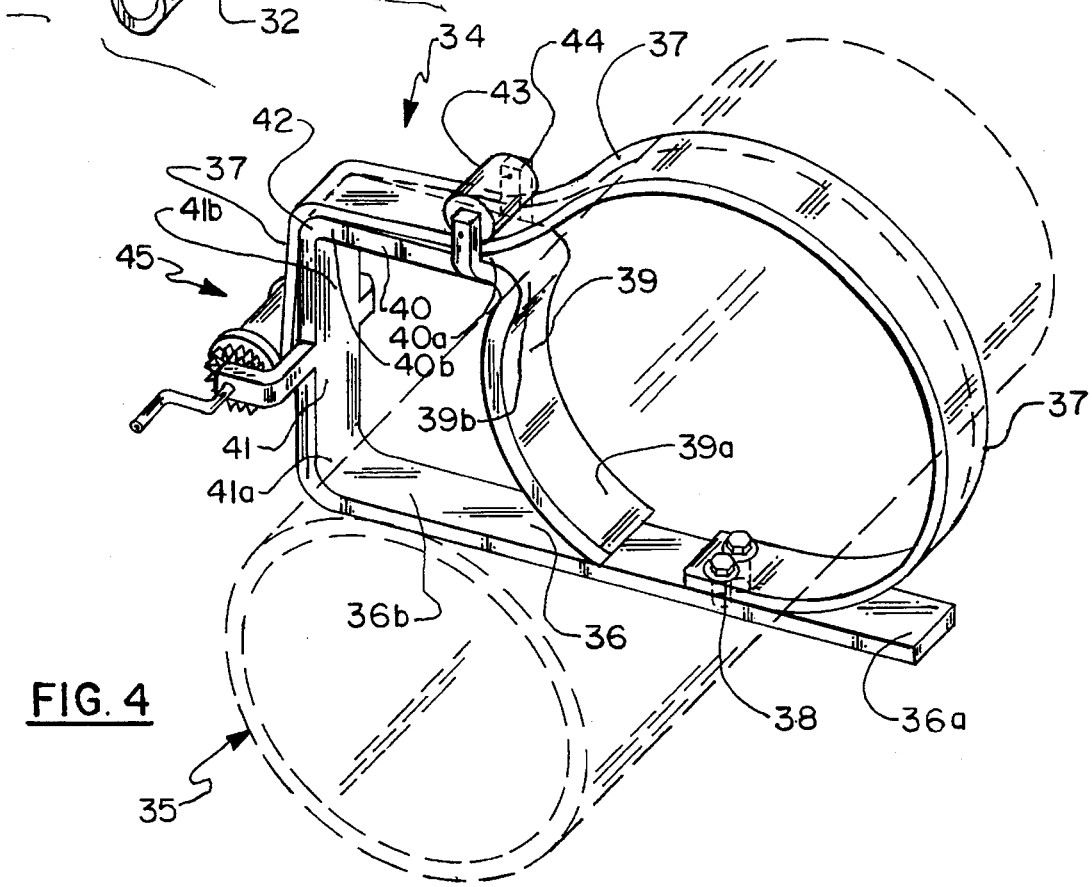
FIG. 4 is a view in perspective of a strap type of an anti-rotation clamp for gated irrigation pipe shown generally about a section of gated irrigation pipe (The pipe is shown in phantom lines.).

Referring now primarily to FIG. 4, a modified anti-rotation clamp for gated irrigation pipe, identified in general by the reference numeral 34, is shown. The modified clamp 34 is adaptable to fit a variety of diameters of pipe, one of which as is identified in general by the reference numeral 35 in the FIG. 4 drawing and is shown in phantom lines.

The modified clamp 34 includes a base plate 36 that is placed under the pipe 35. The base plate 36 includes a first base end 36a and a second base end 36b. A flexible strap 37 is attached at one end thereof to the base plate 36 at a location that is generally under the pipe 35 and is somewhat closer to the first base end 36a than to the second base end 36b. The one end thereof of the flexible strap 37 is attached to the base plate 36 by a pair of bolts 38 or by any other method as desired.

The flexible strap 37 is constructed of a flexible fabric such as a nylon strapping, although any suitable material, such as a rope (not shown), a cable (not shown), or a chain (not shown) are substituted for the flexible fabric as desired.

An arcuate member 39 is attached at a first arcuate end 39a to the base plate 36 generally near to where the one end of the flexible strap 37 is attached. The arcuate member 39 includes a radius and a contour that is adapted to receive a variety of diameters of pipe 35. The radius and contour of the arcuate member 39 is either formed to include a simple radius as desired or includes a compound radius that is optimized to receive the greatest variety of diameters of pipes 35 that is possible.

A horizontal member 40 is attached at a first horizontal end 40a to a second arcuate end 39b and extends in a generally parallel orientation with respect to the base plate 36 from the second arcuate end 39b towards the second base end 36b. The horizontal member 40 is separated a predetermined distance apart from the base plate 36 as is defined by the length and by the contour and position selected for the arcuate member 39. The horizontal member 40 includes a second horizontal end 40b that is located generally above the second base end 36b.

A vertical member 41 is attached at a first vertical end 41a to the second base end 36b and is attached at a second vertical end 41b to the second horizontal end 40b. The connection between the second vertical end 41b and the second horizontal end 40b includes a radius 42 to allow the flexible strap 37 to smoothly pass over the radius 42 as is described in greater detail hereinbelow.

A first friction reducing roller 43 is attached to the horizontal member 40 of the modified clamp 34 near to the first horizontal end 40a and is elevated therefrom a sufficient amount by a pair of support posts 44 that are attached to the horizontal member 40 to allow the flexible strap 37 to pass between the horizontal member 40 and the first friction reducing roller 43.

The radius 42 is, of course, replaced with a second friction reducing roller (not shown) to further reduce friction as is desired.

A winch assembly, identified in general by the reference numeral 45, is attached to the vertical member 41. The winch assembly 45 is adapted to receive the remaining end of the flexible strap 37 that is located furthest away from the one end thereof of the flexible strap 37.

The flexible strap 37 extends around the outside of the pipe 35 and back towards the first friction reducing roller 43, which it passes underneath and changes direction of travel approximately ninety degrees of arc. The flexible strap 37 then passes over the horizontal member 40 while being elevated slightly therefrom until the flexible strap 37 makes contact with the horizontal member in the general vicinity of the radius 42.

If according to a modification as described hereinabove, the second friction reducing roller were used in place of the radius 42, the flexible strap 37 would pass over the second friction reducing roller instead of making contact with the radius 42.

The flexible strap 37 remains substantially in contact with the radius 42 as it passes around the radius 42 and as it accordingly changes direction approximately a further ninety degrees of arc. The flexible strap 37 then continues substantially parallel with the vertical member 41 until reaching the winch assembly 45 where it is fastened and is tightened by the winch 45.

As the flexible strap 37 is tightened by the winch assembly 45, slack is removed until the flexible strap 37 bears against the pipe 35 and urges the pipe 35 into contact with the arcuate member 39. As the flexible strap 37 is tightened further the pipe 35 is secured against the arcuate member 39 and also against a small portion of the base plate 36 so that it cannot rotate with respect to the base plate 36. As the base plate 36 is placed upon the ground surface, the pipe 35 is thus prevented from rotating axially along the longitudinal axis of the pipe 35 with respect to the ground surface.

The winch assembly 45 maintains the tension applied to the flexible strap 37 once it is tightened and also includes a release mechanism (not shown) to release the tension that is applied to the flexible strap 37.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An anti-rotation pipe clamp for use with a section of gated irrigation pipe, comprising:

(a) A pair of base means, said pair of base means adapted for placement thereof upon a portion of the ground surface wherein said pair of base means include pivotal means for pivotally attaching each of said pair of base means together; and (b) clamping means for securing said section of gated irrigation pipe thereto attached to said pair of base means wherein said clamping means includes arcuate surface means attached to each of said pair of base means, said arcuate surface means being adapted for receiving said section of gated irrigation pipe thereto and wherein said clamping means includes a crank adapted for cooperating with said pair of base means, wherein said crank is adapted to pivot one of said pair of base means with respect to another of said pair of base means as said crank is rotated;

whereby said clamping means is adapted for substantially preventing axial rotation of said section of gated irrigation pipe with respect to said pair of base means and wherein said section of gated pipe is supported by said anti-rotation pipe clamp and by said ground surface.

2. The anti-rotation clamp as defined by claim 1 wherein said crank includes thread means adapted for cooperating with said one of said pair of base means and having means to maintain said crank in a predetermined position with respect to said another of said pair of base means.

3. The anti-rotation clamp as defined by claim 2 wherein one end of said crank is removable apart from said one of said pair of base means.

4. The anti-rotation clamp as defined by claim 3 wherein a slot is provided in said one of said pair of base means for removing said one end of said crank apart from said pair of base means.

5. The anti-rotation clamp as defined by claim 1 wherein said pair of base means includes a first half base means and a second half base means.

6. The anti-rotation clamp as defined by claim 1 including a gusset member for attaching said clamping means to said base means.

7. The anti-rotation clamp as defined by claim 6 wherein said gusset member includes a plurality of gusset members.

* * * * *